June 27, 1933.  V. E. CARVER  1,915,269
SPRING LUBRICATING TOOL
Filed Feb. 9, 1931
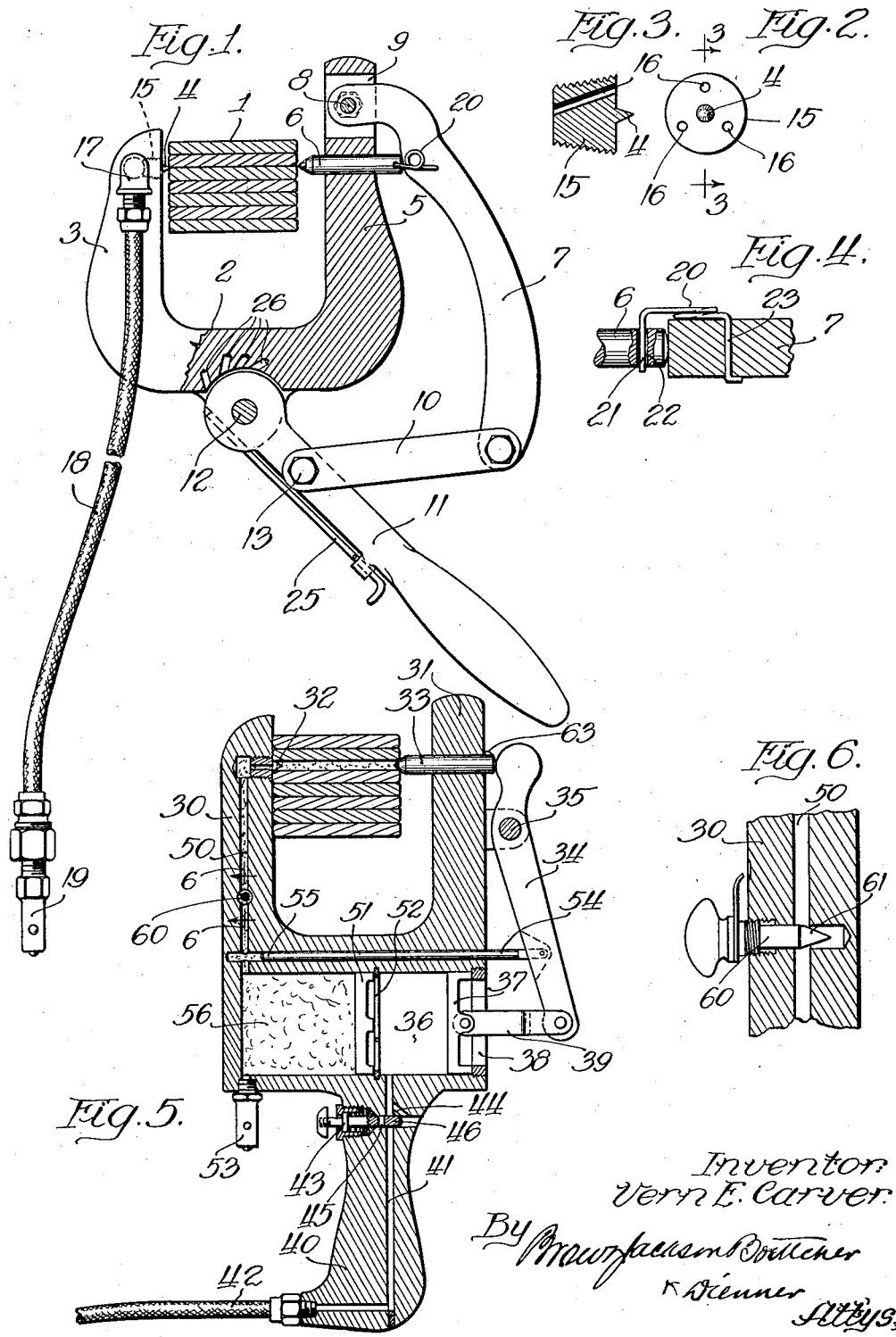
Inventor
Vern E. Carver Patented June 27, 1933

1,915,269

UNITED STATES PATENT OFFICE

VERN E. CARVER, OF CHICAGO, ILLINOIS, ASSIGNOR OF ONE-FOURTH TO VINCENT E. RUTH, ONE-FOURTH TO LEO W. SHANESY, AND ONE-FOURTH TO LEWIS H. TRIPLETT, ALL OF CHICAGO, ILLINOIS

SPRING LUBRICATING TOOL

Application filed February 9, 1931. Serial No. 514,357.

This invention relates to a spring lubricating tool.

Tools designed to spread apart the leaves of a leaf spring such as is used in automobiles and the like, and to force a lubricating medium into the space between the spring thus spread, are old in the art. These prior art devices, of which I am aware, are of little utility for use in connection with modern automobiles for the reason that they are incapable of exerting sufficient pressure to properly spread the springs of the car, and further disadvantageous for the reason that they extend so far laterally from the springs, when they are in position to spread them, that they cannot be used on modern automobiles. As is well known by those skilled in the art, the splash apron, steering mechanism rod, brake mechanism rods, etc. are frequently located substantially parallel and within an inch or so of the spring itself, so that a tool to be useful in spreading the springs of these modern cars must be capable of operating in this very restricted place.

My present invention provides a simple and inexpensive tool which can be successfully employed to spread the springs of a modern automobile and to force a lubricating medium between the springs so spread. The typical tool of my invention in its preferred form is provided in two forms, the one a manually operated tool suitable for use in garages and the like where the number of springs to be greased per day is not excessively large. The second form of the invention provides an automatically operating tool designed to be operated by air pressure and is suitable for use in greasing stations where a large number of springs must be greased in a comparatively short time.

In the preferred embodiment of my invention, a U-shaped framework is provided and equipped with a pair of substantially conical points located near the free ends of the legs of the frame. One of these points terminates in a pin which is movable through the leg of the frame, this movement being caused by a high gain lever system carried by the frame and operated either by the manual lever pivoted to the closed end of the frame or by a fluid pressure cylinder located at the closed end of the frame.

The leg of the frame carrying the fixed point is provided with a duct or channel through which a lubricant may be forced. This duct communicates with a plurality of ports located around the point, the lubricant being forced through these ports when the spring is spread into the space between adjacent leaves of the spring.

The invention can best be understood by reference to the accompanying drawing in which a preferred embodiment of it is shown by way of example and in which:

Figure 1 is an elevational view partly in section of the manually operated tool;

Figure 2 is an end view of the stationary point and surrounding ports drawn to an enlarged scale;

Figure 3 is a cross-sectional view of this point and port taken along the line 3—3 of Figure 2;

Figure 4 is a detail view of an arrangement for holding the movable pin in the frame;

Figure 5 is a cross-sectional view of my pressure operated tool; and

Figure 6 is a detail sectional view taken along the line 6—6 of Figure 5 showing the lubricant duct control arrangement.

Referring now to the drawing in more detail, Figure 1 shows a cross-sectional view of a spring 1, which may be a spring of an automobile truck, bus or the like. This spring is composed of a plurality of separate leaves which are held together by U-shackles in the usual manner.

In modern automobiles these springs are from two to three inches in width and are composed of a plurality of leaves.

The tool frame 2 may be composed of cast steel or if desired may be a steel drop forging. On one leg 3 of this frame is disposed the fixed point 4, while on the opposite leg 5 a longitudinally slidable pin 6 is located so that its axis coincides with the axis of the point 4. This leg 5 also carries a lever 7 pivoted to a screw bolt or rivet 8 located in a socket 9 in the outer end of this leg 5. The lever 7 extends along this leg 5 and is connected to a cross link 10 near the closed end of the frame.

An operating handle 11 is pivoted at 12 to bosses located on the closed end of the frame, and the link 10 is connected to this handle in any preferred manner such as by the bolt 13. Thus it will be seen that if the handle 11 is rotated in a clockwise direction about its pivot 12, through the link 10 it will move the lever 7 and thereby cause it to move the pin 6 to the left. This forces the pointed end of the pin into the space between the adjacent leaves of the spring 1 and since the fixed point 4 is aligned on the crack between the same pair of leaves it also will be forced into that crack and the leaves will thereby be spread. Since the leverage gain through the handle 11, link 10 and lever 7 is high, it is very easy for a man operating the lever 11 to force the pin into the crack between adjacent leaves of a spring without taking the weight off of that spring, this being true for the largest cars now on the market. Obviously by suitable reapportioning of the leverage the tool may be adapted for use in spreading the springs of large busses and trucks.

As will be seen in Figures 2 and 3 the fixed point 4 is preferably formed as a part of a plug 15 which is threaded into a socket or otherwise suitably secured in the leg 3 of the frame. Located concentrically around this point 4 are a plurality of ports 16 which communicate with a grease duct 17 located on the leg 3 of the frame. As shown, this duct comprises a semi-flexible cable 18 and a suitable fitting for permitting its connection with the usual high pressure greasing guns such as are found in garages and greasing stations.

When the lever 11 is operated to its fullest extent and the pin 6 is thereby forced between the adjacent leaves of a spring the grease gun, not shown, connected to the nipple 19 of the grease duct 17 is operated to force a quantity of lubricant through this duct and the port 16 into the space between the leaves. Normally the tool is positioned upon the spring so that it is located at substantially right angles to the parting line of the leaves that are to be separated, in which position one of the ports 16 in the plug 15 is aligned with that parting line. Since there are a plurality of ports, three being shown in Figure 2 by way of example, it is not necessary to definitely align the tool at right angles to the spring in order to bring one of these ports in proper alignment with the space between the leaves when spread, and the tool therefore can be used at various angles with respect to the spring to permit it to spread spring leaves which are more or less inaccessible.

As will be seen in Figure 5 in which the spreading pin is shown in its operated position, i. e. with the spring leaves spread, the edge of the spring adjacent the fixed point is pressed firmly against the leg 3 of the frame and in this position the edges of the leaves of the spring block the ports 16 which are not aligned with the opening caused by spreading the leaves. The quantity of grease that escapes from these blocked ports is so small as to be negligible and the grease from the gun is forced through the unblocked port into the space between the leaves that are spread.

The pin 6 is loosely fitted into the frame and held therein in any convenient manner such as by the spring 20 which is provided with a hook 21 which registers with a hole 22 in the end of the pin 6. The opposite end of the spring 20 is attached to the lever 7 in any convenient manner such as by the hook 23, projected through a suitable hole in the lever. I contemplate providing a group of pins 6 of varying lengths to accommodate the tool to springs of various widths, since the longitudinal movement that the pin 6 can make in the machine is small. The pin can be easily removed from the frame by disengaging the spring 20 from it, and a pin of the proper length can be inserted by reversing the operation.

Frequently it will be desirable to lock the tool with the springs spread, and to this end I have provided a latch 25 slidably mounted upon the lever 11 and engageable with sockets 26 located on the end of the frame 2. When the latch 25 is moved up in Figure 1, its free end engages one of the sockets 26 and holds the lever 11 against movement in either direction.

When the lever 11 is moved to the right at the completion of the greasing of a pair of leaves, the levers 10 and 7 are likewise moved and the pressure upon the adjacent leaves which are seperated is communicated through the sloping surfaces of the fixed points 4 and the pin 6 to move these points out of the space between the springs. The tool is thus released from the spring and moved to permit the insertion of its points between another set of leaves in the spring assembly.

As will be seen in Figure 1 the leg 3 of the frame occupies a small space and can be inserted along side the spring 1 under rather crowded conditions. The leg 5 because of the presence of lever 7 requires slightly more space. However I have found that the arrangement shown is capable of being used on any modern automobile now encountered. The leverage of the lever system is ample to permit a man to easily spread the springs of any car thus far encountered, and since the springs are completely spread it is a comparatively easy manner to force a sufficient quantity of lubricant between the leaves of the spring. Obviously the arrangement shown in Figures 1 to 4 permits lubricating springs at a much more rapid rate than has been possible heretofore. In actual practice of the invention I have found that with the tool the springs of a car can be completely lubricated in one half an hour by a relatively inexperienced operator, whereas with the methods employed heretofore from two and one half to three hours have been required for this same operation.

The tool shown in Figure 1 incorporates a grease duct 18 as an integral part of it, and in most instances this is advantageous. Under certain circumstances this duct may be advantageously omitted and the tool used solely for the purpose of spreading the spring leaves, the lubricating being accomplished separately. A fish tail nozzle on the usual high pressure gun is convenient for such purpose, this nozzle being used after the tool is locked in its operated position with the spring leaves spread. Many car owners prefer that a graphite paste lubricant be placed between the springs with a knife like spreader, and this may conveniently be done while the springs are spread with my improved tool.

Although the tool shown in Figures 1 to 4 greatly speeds up the greasing of springs, and at the same time more thoroughly greases them than has been possible heretofore, I have provided an automatically operating tool particularly designed for use in greasing stations and the like to enable the attendants thereof to grease the spring while the car owner waits for his car. As will be seen in Figure 5, this embodiment of my invention comprises a similar U-shaped frame having legs 30 and 31, in the leg 30 of which is located a fixed point 32, while the leg 31 carries a movable pin 33. Both of these points are conical as before. A lever 34 is pivoted at 35 to the frame and extends down the leg 31 of it.

At the closed end of the frame I have provided a transversely disposed cylinder 36 in one end of which is located a piston 37 which is held therein in any convenient manner such as by the collar 38 threaded in the open end of that cylinder. A lever 39 connects this piston to the free end of the lever 34. The closed end of the tool is also provided with a handle 40 in which is a duct 41 leading to a source 42 of fluid pressure which may be compressed air such as is available in garages and service stations. A valve 43 normally blocks this duct 41 and the cylinder 36 is drained of pressure by the leak port 44 located adjacent this valve 43. When the valve is moved to the right, its port 45 is aligned with the air duct 41 and pressure from the source 42 is admitted to the cylinder 36. The end 46 of the valve blocks the leak port 44 to prevent escape of air from the cylinder. Pressure thus built up in the cylinder moves the piston 37 to the right in the position in which it is shown in Figure 5 causing it to move the levers 39 and 34 to thereby move the pin 33 into the space between adjacent levers of the spring.

The point 32 is surrounded by ports as is shown in detail in Figure 3, which ports communicate with a lubricating duct 50 located in the leg 30 of the frame. This duct communicates with the left hand end, Figure 5, of the cylinder 36, which is separated from the piston end of the cylinder by a movable tight fitting wall 51, limited in its movement by any convenient manner such as the split ring 52. The cylinder thus formed to the left of the sliding wall 51 communicates with the lubricating duct 50 and also with a nipple 53 by which a lubricating medium is forced into it from a high pressure lubricating gun such as is in common use in garages and the like.

Attached to the lever 34 is a valve stem 54 which extends crosswise of the frame and when the lever is in its inoperative position the valve 55 carried by the stem blocks the port 50 and prevents the escape of grease from the grease cylinder 56 through the duct 50 and the ports located around the point 32. As the lever 34 is moved to the right into the position in which it is shown in Figure 5, valve 55 is retracted so that it no longer blocks this port and the pressure in the cylinder 36 acting on the dividing wall 51 forces lubricant in the lubricating cylinder 56 through this duct 50 and the port into the space between the springs which have been spread.

If desired, the quantity of lubricant forced through the duct 50 may be regulated by a valve 60 threaded into the leg 30 of the frame and carrying a pointed member 61 arranged to partially block the duct 50 and thereby regulate the quantity of grease which it will pass. By screwing the valve 60 completely into the leg 30, the cylinder part of this valve can be made to completely block the duct 50 so that the springs may be spread for inspection without forcing any lubricant between them.

The cylinder 56 carries a considerable quantity of grease and by suitable proportioning of the cylinder this quantity can be made large enough to completely lubricate the springs of a car without having to refill the tool.

The pin 33 is one of a plurality of pins with which the tool is provided, each pin being of a different length from the other to permit adapting the tool to the various widths of springs encountered on modern automobiles. As shown, the pin 33 is held in the frame leg 31 by the joint action of the end of the lever 34 and the spring pressed ball 63. This ball 63 is spring pressed into a socket formed in the end of the pin in the manner now commonly used in socket wrenches and well understood by those skilled in the art. This showing is made by way of example only as the pin 33 may be retained in the frame in the same manner as is pin 6 of Figure 1, and conversely the latter pin 6 may also be provided with a ball 63 in lieu of the spring arrangement shown.

The specific details of the tool shown in Figure 5 may be varied within the teachings of my invention. The grease duct 50 shown as located within the frame leg may be formed as a pipe located outside of that leg. The dividing wall 51 may be fixed, instead of movably fitted in the cylinder, and the movement of lubrication then controlled by the gun, not shown, attached to the nipple 53. Preferably the frame of this tool is made of cast steel as is the frame of the previously explained embodiment.

The operation of the tool shown in Figure 5 is obvious, it is simple and entirely automatic so that an operator may rapidly spread and lubricate the springs of a vehicle without difficulty. I have shown the specific embodiment by way of example only as it may be modified to meet particular requirements within the teaching of my invention.

Having thus complied with the statutes and shown and described a preferred embodiment of my invention, what I consider new and desire to have protected by Letters Patent is pointed out in the appended claims:

What is claimed is:

1. A leaf spring lubricating device comprising a rigid U-shaped frame, a pair of opposed conical points supported on said frame near its open end, one of said points being fixed and the other movable, a lever pivoted to the free end of said frame adjacent to and engageable with said movable point, a second lever pivoted to the closed end of said frame, a link connecting said levers to cause a movement of the second to move the first and thereby move the movable point toward the fixed, and a greasing means carried by said frame and including ports adjacent said fixed point.

2. A lubricating tool comprising a U-shaped frame adapted to be slipped over a leaf spring and located thereon with the edges of the leaves adjacent the free ends of the legs of the frame, a pointed pin projecting through one leg of said frame and longitudinally slidable therein, a lever system carried on said frame and terminating in a handle pivoted to the closed end thereof for moving said pin longitudinally, said system including a manually operable lever pivoted to the closed end of said frame, a fixed conical point located in the other leg of said frame, a grease duct in said leg communicating with a plurality of ports evenly spaced around said fixed point, said points being forced between adjacent leaves of the spring by a longitudinal movement of said pin to permit forcing a lubricant through said duct and ports into the space therebetween.

3. The combination of a rigid U-shaped frame, a stationary conical point disposed in one leg of said frame near the open end thereof, a pointed pin slidably located in the opposite leg of said frame and in alignment with said point, a lever pivoted to said latter leg adjacent said pin, said lever engaging said pin, a second lever pivoted to the frame at its closed end, a link connecting said levers to cause a movement of one of them to move the other and thereby move said pin, and a grease connection on said frame communicating with ports located adjacent said point.

4. The combination of a rigid U-shaped frame, a stationary conical point disposed in one leg of said frame near the open end thereof, a pointed pin slidably located in the opposite leg of said frame and in alignment with said point, a lever pivoted to said latter leg adjacent said pin, said lever engaging said pin and extending beyond the closed end of said frame, means holding said pin in said frame, a second lever pivoted to the frame at its closed end, a link connecting said levers to cause a movement of one of them to move the other and thereby move said pin, and a grease connection on said frame communicating with ports located adjacent said point.

5. The combination of a rigid U-shaped frame, a stationary conical point disposed in one leg of said frame near the open end thereof, a pointed pin slidably located in the opposite leg of said frame and in alignment with said point, a lever pivoted to said latter leg between said pin and the free end of the leg, said lever engaging said pin and extending beyond the closed end of said frame, a second lever pivoted to the frame at its closed end, a link connecting said levers to cause a movement of one of them to move the other and thereby move said pin, a latch on said frame for holding said latter lever in its set position, and a grease connection on said frame communicating with ports located adjacent said point.

6. The combination of a rigid U-shaped frame, a stationary conical point disposed in one leg of said frame near the open end thereof, a pointed pin slidably located in the opposite leg of said frame and in alignment with said point, a lever pivoted to said latter leg between said pin and the free end of the leg, said lever engaging said pin, means on said lever engaging said pin to hold it in said frame, a second lever pivoted to the frame at its closed end, a link connecting said levers to cause a movement of one of them to move the other and thereby move said pin, and a grease connection on said frame communicating with ports located adjacent each point.

In witness whereof, I have hereunto subscribed my name this 3d day of February, 1931.

VERN E. CARVER.